United States Patent Office 2,803,530
Patented Aug. 20, 1957

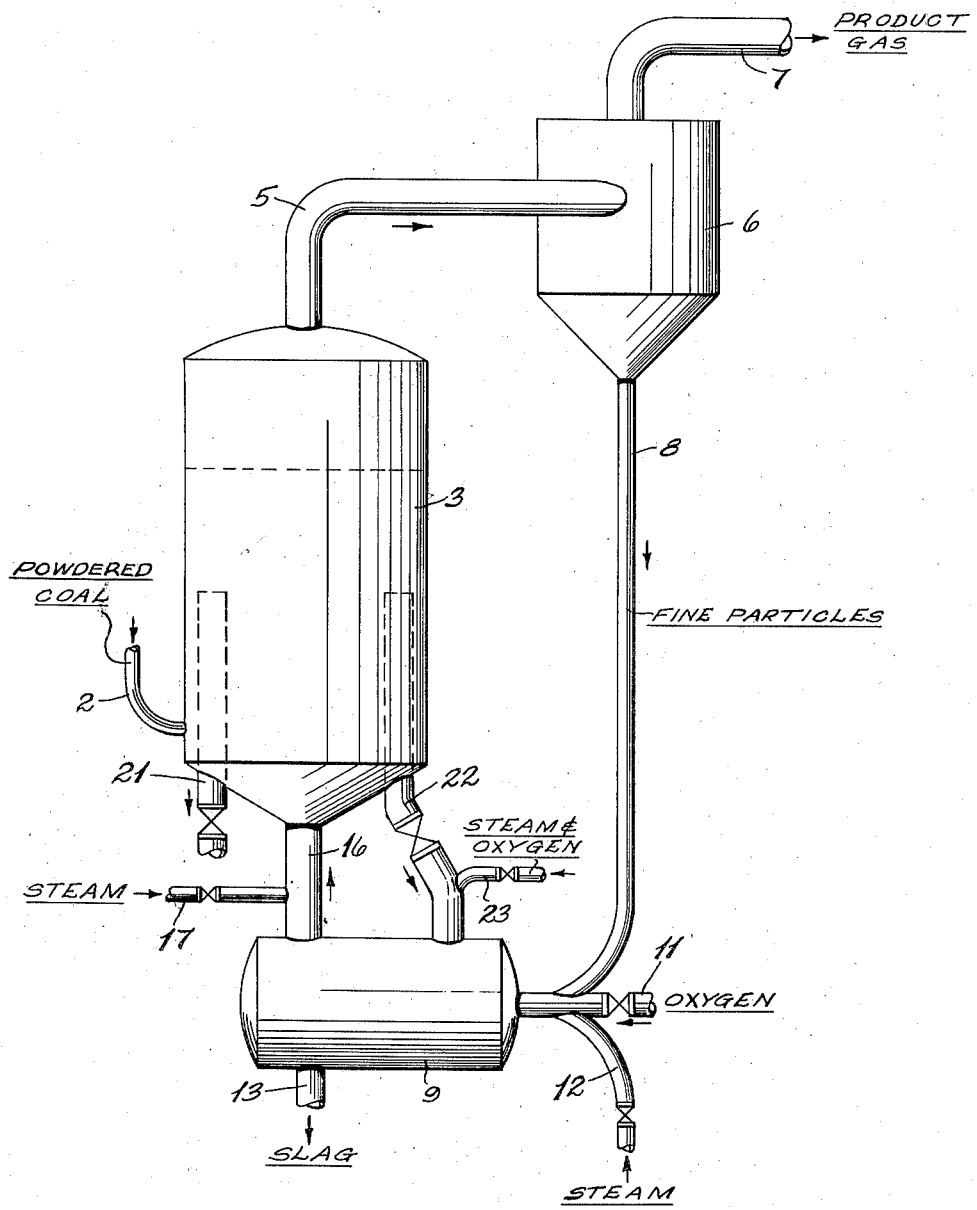

2,803,530

PROCESS FOR THE PRODUCTION OF CARBON MONOXIDE FROM A SOLID FUEL

Clifford G. Ludeman, Scarsdale, N. Y., assignor to Texaco Development Corporation, New York, N. Y., a corporation of Delaware Application May 28, 1952, Serial No. 290,463

1 Claim. (Cl. 48—206)

This invention relates to a process for the generation of carbon monoxide and hydrogen from a solid carbonaceous fuel. In one of its more specific aspects, this invention relates to an improved method for the reaction of the powdered coal with oxygen and steam to produce carbon monoxide and hydrogen.

Gasification of coal to carbon monoxide and hydrogen is an industrially important operation. Coal and related solid fuels may be reacted with a restricted quantity of free oxygen at temperatures above about 1,800° F. to produce carbon monoxide and hydrogen relatively free from carbon dioxide. The reaction may be carried out with air, in which case the product gas contains a relatively high percentage of nitrogen. Because this is generally undesirable, oxygen or oxygen-enriched air may be preferred. In any case, the reaction, being exothermic, liberates more heat than is required to maintain the desired reaction temperature. Carbon dioxide or steam may be added to the reaction zone to control the reaction temperature. Steam is generally preferred as an auxiliary reactant, serving to control the temperature in the reaction zone and, at the same time, to produce hydrogen.

A number of processes have been developed for gasification of coal. In one, a downwardly moving bed of coal is contacted with an upwardly moving current of air, or oxygen, and steam. In another, the gaseous reactants pass upwardly through a bed of particles of the solid fuel at a rate such that the particles are violently agitated by the gaseous reactants and reaction products but are not entrained therein. This process is generally known as "fluid bed" gasification, indicating that the gasification takes place in a bed of solid particles which, due to the action of the gases, has the appearance of a boiling liquid. In still another, powdered coal is subjected to reaction with the gaseous reactants while entrained in the reactants and reaction products. The relative proportions of solid fuel and reactants is so adjusted that there is little or no excess fuel supplied to the reaction zone. This process may be designated as "flow-type" gas generation. As used hereinafter, the term "flow-type" gas generation designates such a process in which the coal is reacted with an oxygen-containing gas while entrained therein.

Various solid fuels including lignite, anthracite and bituminous coals, coke, and oil shale may be subjected to gasification.

Carbon monoxide, hydrogen and mixtures thereof are useful in a number of industrial processes. For example, liquid hydrocarbons suitable for use as motor fuels may be produced by reaction of hydrogen with carbon monoxide in the Fischer-Tropsch type synthesis reaction. Carbon monoxide and hydrogen are useful, either alone or in admixture with one another, for the reduction of iron oxide to sponge iron. Hydrogen finds use in a number of commercial processes, such as the synthesis of ammonia, hydrogenation processes, catalytic conversion of petroleum hydrocarbons, etc. Carbon monoxide is readily converted to hydrogen by the so-called water gas shift process in which carbon monoxide is reacted with steam to produce hydrogen and carbon dioxide.

As previously mentioned, air, oxygen-enriched air or commercially pure oxygen may be used in gas generation. Commerically pure oxygen is preferred for the generation of gases in those instances in which nitrogen is undesirable in the product. In generating gas for ammonia synthesis, oxygen-enriched air may be preferred.

For the production of maximum yields of the carbon monoxide and hydrogen in the flow-type generator, the temperature must be maintained above about 2,000° F. and preferably above about 2,200° F. The temperature may range as high as 3,000° F., or even higher, the maximum being limited by the properties of available materials of construction.

Fluid bed gasification is usually conducted at a temperature within the range of from about 1,400 to about 2,200° F.

The gasification reaction may be conducted at either atmospheric or at an elevated pressure. Often it is preferable to conduct the reaction at a pressure in excess of 100 p. s. i. g. Pressures on the order of 500 p. s. i. g. or higher may be used. At elevated pressures, the rate of reaction is somewhat higher than at lower pressures. If the product gas is to be used at an elevated pressure, operation of the gasifier at elevated pressure effects a savings in cost of compression.

In the gasification of solid fuels generally, it is desirable to limit oxygen consumption to the practical minimum consistent with satisfactory operation; i. e., it is desirable to limit the quantity of oxygen supplied to the reaction zone to near-theoretical quantities to produce carbon monoxide with minimum production of undesirable carbon dioxide and water vapor. Low oxygen consumption is also important from the economic standpoint, particularly if substantially pure oxygen is required. Limiting the quantity of oxygen often leads, however, to incomplete consumption of carbon. This problem is particularly evident in gasification of solid fuel in the flow type gasification reactor or in the fluid bed reactor.

Theoretically, the rate of gasification of solid fuel with an oxygen-containing gas should increase as the particle size of the solid fuel is decreased. This follows from the fact that as the particle size decreases, the surface area per unit mass increases. Since the oxidation takes place on the surface of the particles, it is to be expected that the rate of gasification of very fine particles would be much greater than that of the somewhat larger particles, for example, those granular in size. Accordingly, it might be expected that the very fine particles of solid material which are entrained in the product gas from the gasification zone would be essentially ash. In practice, however, it is often found that fine particles are carried from the reaction zone in the product gas stream before their carbon content has been completely consumed. Fine particles of solid material carried from the reaction zone in the product gas often contain a surprisingly high proportion of unreacted carbon. The present invention overcomes this problem by substantially completely consuming the fine particles as will be explained in greater detail hereinafter.

One of the objects of this invention is to provide an improved process for the generation of carbon monoxide and hydrogen from a solid carbonaceous fuel by reaction with oxygen and steam. Another object is to provide a process for generation of carbon monoxide and hydrogen wherein the efficiency of gasification is substantially increased.

In accordance with this invention, solid fuel, for example, coal, in the form of small particles, is subjected to gasification. The particles are smaller than about 3/8 inch in diameter, and may range downward to extremely fine particle sizes.

The coal is introduced into a fluid bed gasification reaction zone wherein a dense phase fluidized bed of coal particles is maintained. A stream of gaseous reactants, comprising steam, carbon dioxide and an oxygen-containing gas, are passed upwardly through the reaction zone at a rate sufficient to violently agitate the particles but insufficient to entrain particles larger than about 150 to 200 mesh (.003 to .004 inch). The agitation by the gas stream gives the bed of particles the appearance of a boiling liquid. Fine particles entrained in the resulting gaseous reaction products, i. e., particles smaller than about 150 to 200 mesh, are separated therefrom and subsequently reacted with an oxygen-containing gas in such proportions that they are substantially completely burned to carbon dioxide. The carbon dioxide so produced is supplied to the fluid bed gasifier as gaseous reactant therefor. By means of this process, the gasification of fine particles is insured.

In a specific embodiment, combustion of the fine particles is carried out in a separate flow-type gas generator. The flow-type gas generator is operated at a temperature above the melting point of the slag or ash, generally above about 2,200° F. so that the ash or slag may be discharged from the generator in a molten state. The resulting products from the flow generator, together with unreacted oxygen (if present) and steam pass into a fluid bed gasification zone containing largely the coarser particles of the coal feed.

A portion of the larger particles originally fed to the fluid bed gasification zone is disintegrated within the reaction zone to particles of a size such that they are entrained in the reaction products and subsequently fed to the flow-type gas generator. Particles which are not so disintegrated are subsequently removed from the fluid bed gasification zone and may be supplied in whole or in part to the flow-type gas generator.

Particle sizes of the coal feed preferably are within the range of from about one-eighth inch in average diameter to particles smaller than 200 mesh. Some particles may be smaller than 325 mesh. In general, it is not desirable that more than 40 percent by weight of the feed have a particle size smaller than 200 mesh.

The invention will be more readily understood from the accompanying drawing and the following detailed description, which is a more or less diagrammatic illustration of an arrangement of apparatus suitable for carrying out a preferred embodiment of the present invention.

With reference to the drawing, coal containing particles ranging in size from about 1/8 inch to 325 mesh is introduced through line 2 into a gasification reaction vessel, or gasifier, 3. A fluidized bed of solids is maintained in gasifier 3 with the upper level of the bed somewhat below the top of the vessel to permit disengagement of the product gas and entrained finer particles from the coarser particles. Gaseous reactants comprising free oxygen pass upwardly through the fluidized bed of fuel particles in the reaction zone, effecting fluidization of the particles and gasification of the fuel with the production of carbon monoxide and hydrogen. Gaseous reactants are supplied at a rate sufficient to produce a linear velocity of the order of from about 4 to about 12 feet per second, based on the free cross-sectional area of the gasification reaction zone. A temperature above about 1,400° F., preferably above about 1,600° F., is maintained within the gasification zone. The temperature is preferably as high as possible but should be kept about 50° F. below softening point of the ash, i. e., the temperature which causes softening of the ash and agglomeration of the particles. Generally the temperature will be within the range of from about 1,600° F. to about 2,100° F.

The product gas is discharged from the gasification reaction vessel 3 through line 5 into a separator 6. Separator 6 may comprise any conventional means for separation of fine particles from the product gas. A cyclone separator is generally satisfactory and will effect removal of all but the finest particles from the product gas stream. The product gas stream may be further treated, if desired, for removal of ultra-fine particles passing the cyclone separator. The product gas stream is discharged through line 7.

Particles of fuel separated from the product as in separator 6 are passed through line 8 into a flow-type gas generator 9. These fine particles are brought into intimate contact with oxygen from line 11 in an amount sufficient to insure complete consumption of the carbon contained in these particles. The fine particles are preferably supplied to the generator at an elevated temperature substantially equal to the temperature of the gases leaving the gasification vessel 3. These particles may, for example, be at a temperature within the range of from 1,500 to 1,800° F. Steam may be supplied, if desired, to the flow-type gas generator 9 through line 12. It is generally preferable to contact the fine particles with the oxygen prior to the addition of steam. The oxygen is preferably preheated and may, for example, be preheated to a temperature within the range of from about 400 to about 800° F. The steam serves to limit the temperature within the generator and, at the same time, it is further preheated prior to introduction to the gasifier 3. The flow-type gas generator, or burner 9, is operated at a temperature above the melting point of the ash or slag, suitably within the range of from about 2,200° F. to about 3,000° F.

The molten slag is discharged from the generator through line 13. Hot gases from the generator 9 pass through line 16 into the lower part of the vessel 3. Additional steam, oxygen, or both may be added, if desired, through line 17.

The quantity of oxygen supplied to gas generator 9 is generally in excess of the amount required for complete combustion of the fine particles so that some free oxygen may be introduced into gasifier 3 from the generator 9.

To prevent the accumulation of residue of coarse particle sizes within the gasifier 3, particles may be withdrawn from the bed through a standpipe 21 to be discarded or used as fuel in some other part of the plant. If desired, particles from the gasifier 3 may be withdrawn through standpipe 22 and supplied to the gas generator 9. In this instance, additional oxygen or a mixture of steam and oxygen may be introduced to the reaction zone through line 23. In any event, sufficient oxygen is supplied to the reaction zone to insure substantially complete consumption of the carbon contained in the particles introduced through line 22, as well as in the fine particles from line 8.

It will be evident that, with a given solid fuel, the operation of the gasification reaction equipment may be controlled by controlling the extent of grinding of the feed coal so that more or less is of a particle size such that it will be separated from the remaining particles in the gasifier 3 and supplied as fuel to gas generator 9. Alternatively, the velocity of the gas stream in the gasifier 3 may be varied to vary the size and quantity of the particles carried out of the bed by entrainment in the product gases.

Obviously many modifications and variations of the invention as hereinbefore set forth may be made without departing from the spirit and scope thereof and, therefore, only such limitations should be imposed as are indicated in the appended claim.

I claim:

In a process for the production of carbon monoxide and hydrogen by reacting a solid carbonaceous fuel containing an incombustible residue and consisting of particles within the size range of from about 3/8 inch to about 150 to 200 mesh and particles smaller than 150 to 200 mesh with an oxygen-containing gas in a fluidized bed maintained in a gasification reaction zone at a temperature above about 1800°F. wherein fresh fuel particles are charged directly into said fluidized bed; the improvement which comprises passing reactant gases comprising steam, carbon dioxide and oxygen-containing gas upwardly through said fluidized bed at a rate effecting fluidization of said bed and entrainment of fuel particles smaller than 150 to 200 mesh therefrom in resulting product gases without substantial entrainment of larger particles; separating said entrained smaller fuel particles from said product gases; subjecting said separated smaller fuel particles to substantially complete combustion with free oxygen and steam in a separate reaction zone at a temperature above 2200°F. effecting substantially complete consumption of carbon contained therein and producing hot products of combustion comprising carbon dioxide and steam; and passing said hot products of combustion resulting from consumption of said smaller fuel particles at said combustion temperature and substantially free from solid residue into said gasification reaction zone into contact with said fluidized bed as reactant gas.

References Cited in the file of this patent

UNITED STATES PATENTS

| | | |
|---|---|---|
| 2,554,263 | Nelson | May 21, 1951 |
| 2,606,145 | Creelman | Aug. 5, 1952 |
| 2,623,815 | Roetheli et al. | Dec. 30, 1952 |
| 2,677,603 | Van Loon | May 4, 1954 |